(12) United States Patent
Koretz (10) Patent No.: US 6,879,691 B1
(45) Date of Patent: Apr. 12, 2005

(54) INFORMATION AUTOCOMPLETION SYSTEM

(75) Inventor: David A. Koretz, Rochester, NY (US)

(73) Assignee: BlueTie, Inc., Rochester, NY (US)

(*) Notice: Subject to any disclaimer, the term of this patent is extended or adjusted under 35 U.S.C. 154(b) by 852 days.

(21) Appl. No.: 09/853,539

(22) Filed: May 11, 2001

Related U.S. Application Data (60) Provisional application No. 60/203,745, filed on May 12, 2000.

(51) Int. Cl.[7] ............................................... H04K 1/02
(52) U.S. Cl. ...................................... 380/255; 713/168
(58) Field of Search ........................... 380/255; 713/168

(56) References Cited

U.S. PATENT DOCUMENTS

| | | | | |
|---|---|---|---|---|
| 5,101,425 A | * | 3/1992 | Darland et al. | 379/34 |
| 5,210,789 A | * | 5/1993 | Jeffus et al. | 379/127 |
| 5,551,030 A | * | 8/1996 | Linden et al. | 395/600 |
| 5,617,114 A | * | 4/1997 | Bier et al. | 345/113 |
| 5,640,577 A | * | 6/1997 | Scharmer | 395/68 |
| 5,694,563 A | * | 12/1997 | Belfiore et al. | 395/352 |
| 5,790,793 A | * | 8/1998 | Higley | 395/200.4 |
| 5,794,259 A | * | 8/1998 | Kikinis | 707/507 |
| 5,805,811 A | * | 9/1998 | Pratt et al. | 395/200.36 |
| 5,917,491 A | * | 6/1999 | Bauserfeld | 345/352 |
| 5,960,411 A | * | 9/1999 | Hartman et al. | 705/26 |
| 5,963,949 A | * | 10/1999 | Gupta et al. | 707/100 |
| 5,999,938 A | * | 12/1999 | Bliss et al. | 707/102 |

* cited by examiner

Primary Examiner—Thomas R. Peeso
(74) Attorney, Agent, or Firm—Nixon Peabody LLP (57) ABSTRACT

A communication system enters information into enabled fields of a hypertext based page when a hot-linked identifier is activated by a user. The preferred implementation fills in recipient information when a sender clicks on a hot-linked contact name. The click calls a JavaScript that searches for enabled fields and fills in recipient information from a contact database when it finds an enabled field. The recipient could be defined by an e-mail address, a user name, or other unique identifier, and the information being transmitted to the recipient can be e-mail messages, data files, another user's data, and other types of information that can be transmitted electronically. The preferred implementation resides on a Web server hosting a service to which users can subscribe, at which point the users acquire member status and member names. The members can create contact databases that the system presents in a contacts frame when the member views pages on which the contact information can be used. If the member goes to a page from which the member can send a message, transfer a file, etc., the member simply clicks on a contact listed in the contacts frame, calling the field filler function that looks for enabled fields and puts appropriate information in the enabled fields. For example, the field filler can place an e-mail address or member name in a recipient field.

33 Claims, 7 Drawing Sheets

Simple Click

Simple Click
FIG. 1

Simple Click
FIG. 2

INFORMATION AUTOCOMPLETION SYSTEM

This application claims the benefit of U.S. Provisional Application No. 60/203,745, filed 12 May 2000, which provisional application is incorporated by reference herein.

TECHNICAL FIELD

The invention relates to electronic communication, information sharing, and collaboration between individuals. The invention particularly relates to facilitation of electronic messaging between individuals.

BACKGROUND OF THE INVENTION

In most applications for electronic communication, the user must supply a destination address in the form of an e-mail address, a URL, an IP address, a fax number, or the like. While there are contact databases (commonly referred to as "address books") that accompany most such applications, there are few address books that can be used with more than one or two applications other than a primary application with which they are associated. Thus, a user must duplicate contact information in a plurality of address books and must usually provide at least a nickname for or a beginning of the destination address for an address book to provide a complete destination address in a destination field associated with a message. In addition, when one individual tries to send a message to another, the recipient is often not available by the method the sender selects. While e-mail and voice mail allow storage of the message until the recipient returns and retrieves the message, sometimes this is simply inadequate when the recipient might be reached by other methods.

SUMMARY OF THE INVENTION

The invention preferably provides a list of contacts in a central contact database and displays the list in a form that allows a user to view the list while accessing a plurality of communication, information, and collaboration applications. Clicking on one of the contacts automatically fills in the recipient's contact information in a field enabled in accordance with the teachings of this invention (hereinafter referred to as a "one-click" enabled field). Typically, this will be the destination address field of any page with a one-click enabled address field. For example, if the user views a file transfer application, the user can click on "John" and the instant invention automatically fills in all relevant information for John, including such information as his network username or e-mail address. Then the user simply initiates file transfer.

DESCRIPTION OF THE INVENTION

This invention provides an easy way to facilitate communication, collaboration, and information sharing. A user can send messages or share resources by simply clicking on a specific contact in a list of contacts. The system uses the contact information to provide any required destination information. From the user standpoint, the user sees his or her list of contacts and clicks one contact as a destination. The name of a contact item (individual or group) or an appropriate address appears in a specific field, such as the "To:" or "CC:" field of an e-mail message. The system can use the recipient information from the Information Distribution System of U.S. patent application Ser. No. 09/853,537 filed concurrently herewith, contacts, or groups, and can be used with the Secure File Transfer System of U.S. patent application Ser. No. 09/853,538 filed concurrently herewith. The disclosures of the two above-mentioned applications (09/853,537 and 09/853,538) are hereby incorporated by reference.

Every page enabled with the instant system has at least one default one-click enabled field. One-click enabled fields are page elements that accept one-click and can be identified as enabled fields by tags, such as hypertext tags, in the source code of the page. (It should be noted, however, that this system is not based solely on the use of hypertext; other implementation mediums are possible as well.) I prefer to identify enabled fields in functions embedded in the source code of a page including the fields. The way that a one-click enabled field is handled can be different for every page, or even for every enabled field on a page, which makes the instant system very flexible. If there are more than one one-click enabled field on a page (Target), then one-click is automatically applied either to the one on which the user is focused at the time the user clicks or to a default enabled field if the user is not focused on an enabled field.

In the preferred embodiment, the system requires two parts: one includes a list of contacts and the other is a one-click enabled page with one or more one-click enabled fields. Preferably, the list of contacts is available to the user in the form of hot-linked contact listings. I prefer to keep the contact listing in a frame of a browser window or to have the contact listing at least appear in a consistent portion of related pages. However, the system does not require a browser. It could be contained in a desktop application without a browser. When a user clicks on one of the contacts, the contact list calls a function (e.g.—"OneClick") that passes specific parameters to itself depending on what kind of contact is clicked (i.e.—group, card, or individual contact). For example, if a group contact is clicked, the function can pass all e-mail addresses of the group members to itself. This is an exemplary implementation of the "OneClick" function:

```
<SCRIPT LANGUAGE=JavaScript>
    //client JavaScript functions
    function OneClick (msg, id)
    { parent.ioffice_main.ProcessOneClick (msg, id) }
</SCRIPT>
``` called by an exemplary hot-linked contact named "John" as follows:

```
<a href='JavaScript:OneClick("John", "card:x1y2zzz34567:");'>
```

The function "OneClick" calls a function "ProcessOneClick," implemented in the Target page, and sends the new function essential parameters. The function "ProcessOneClick" defines the behavior of a given one-click enabled field and does all the work for filling in a corresponding one-click enabled field, such as "To:" in e-mail or "Share With:" in a shared files area. I prefer to implement both of these functions in JavaScript, but they could be implemented in another suitable scripting or programming language.

Figure 1:
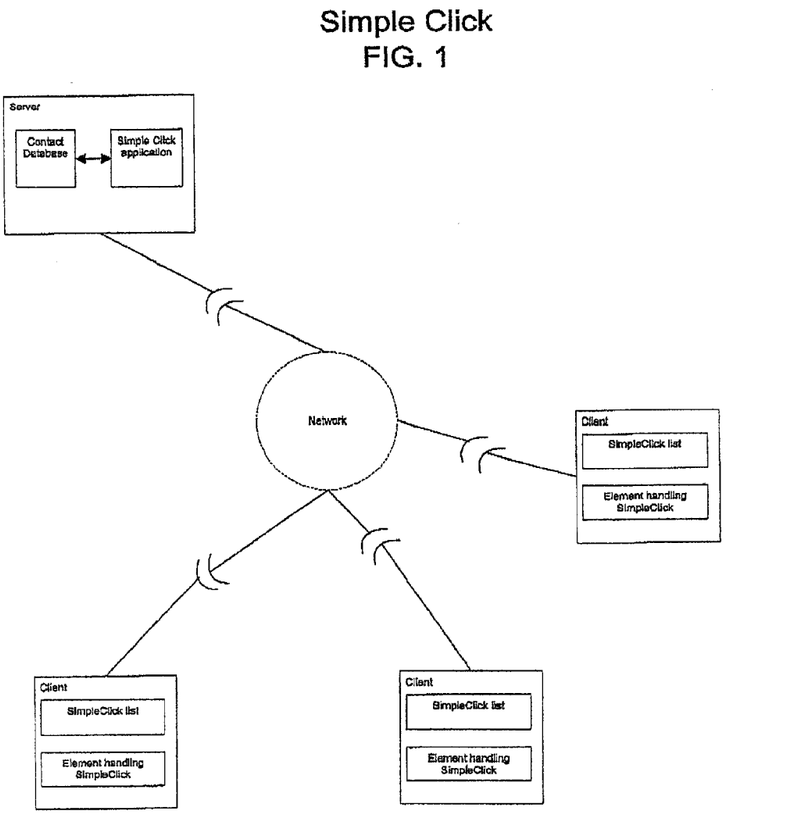
FIG. 1 is a schematic representation of the server, network, and clients used in the instant invention.
Figure 2:
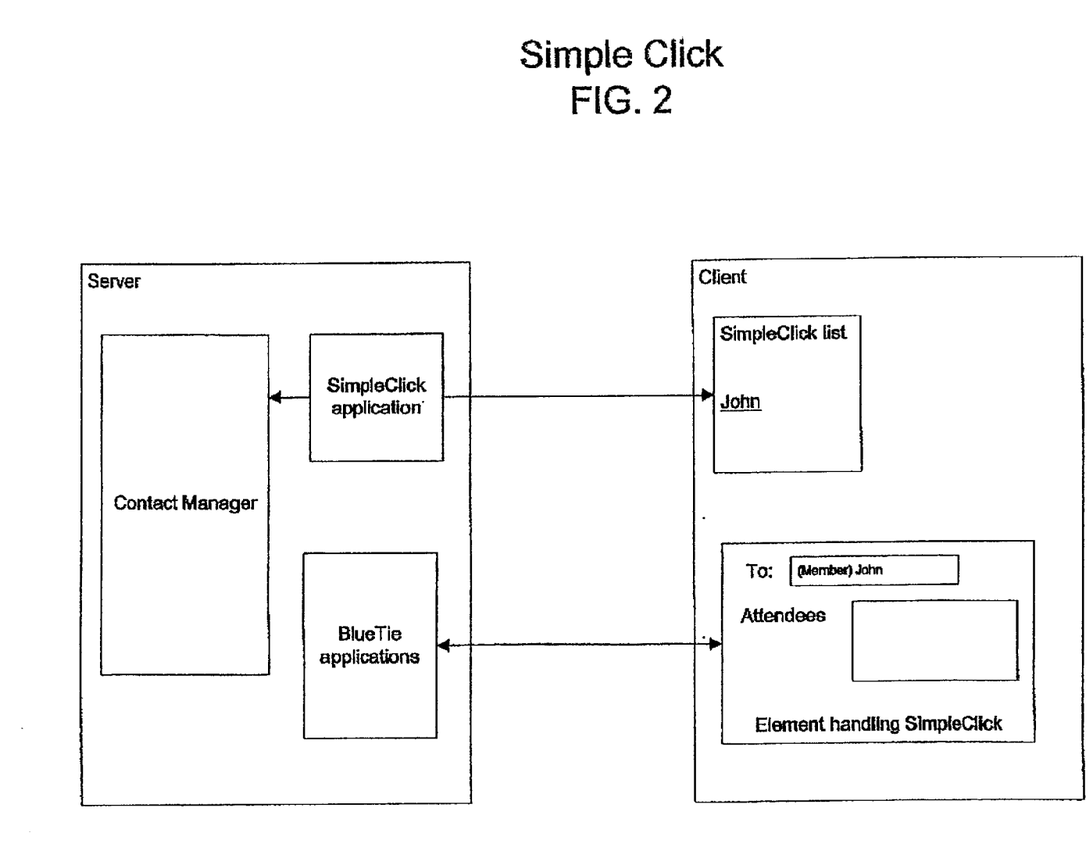
FIG. 2 is a schematic representation of the invention deployed in a server.
Figure 3:
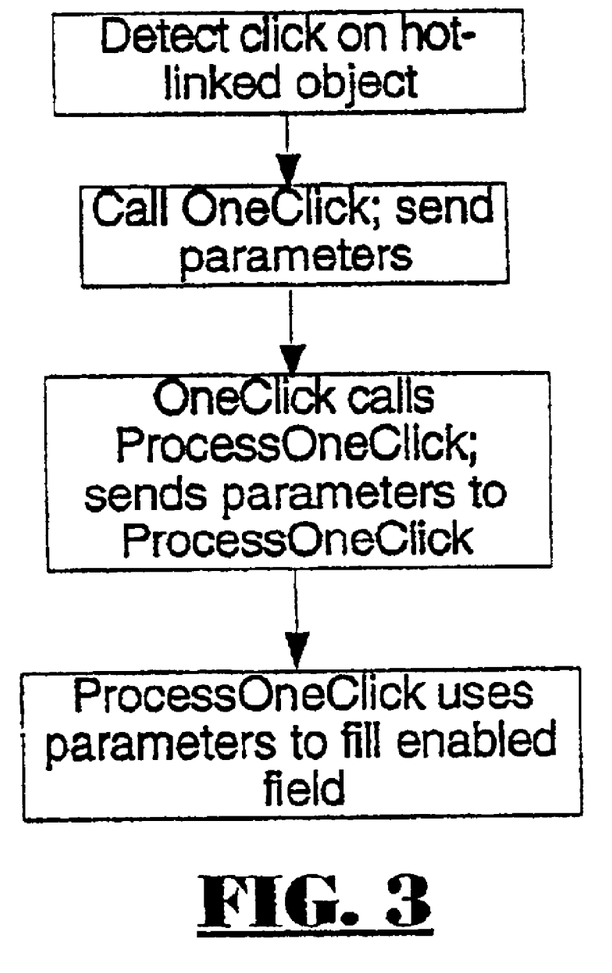
FIG. 3 is a schematic flow diagram of the process carried out by a preferred implementation of the invention.
Figure 4:
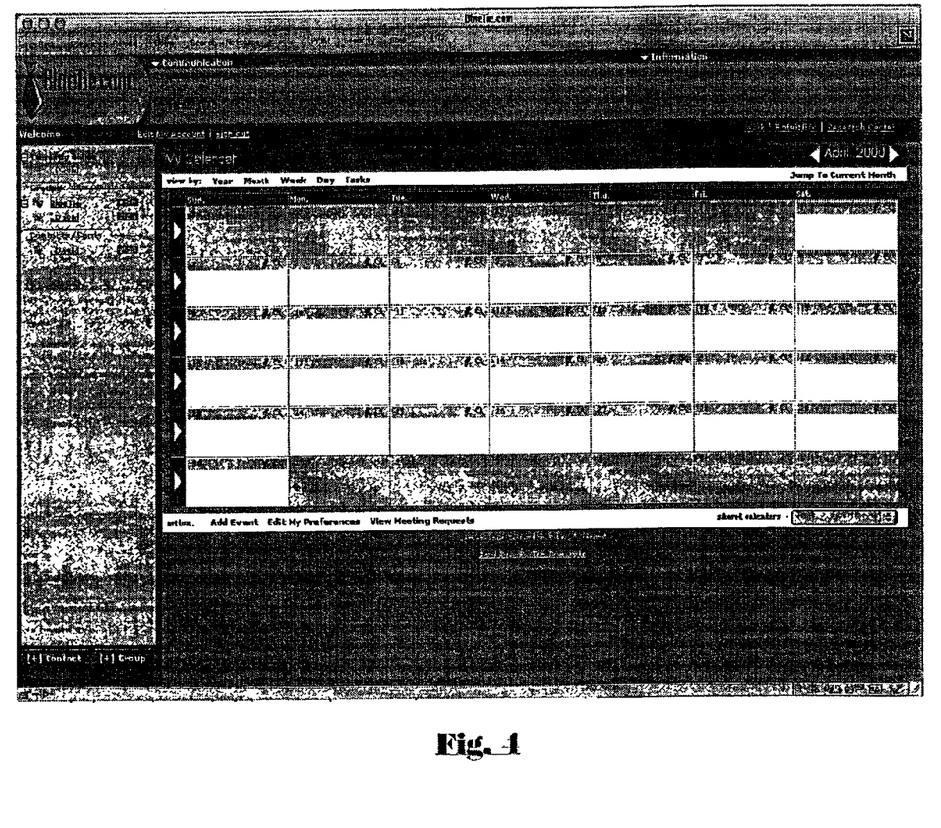
FIG. 4 is a schematic screenshot of a calendar page of the invention showing a contacts listing on the left.
Figure 5:
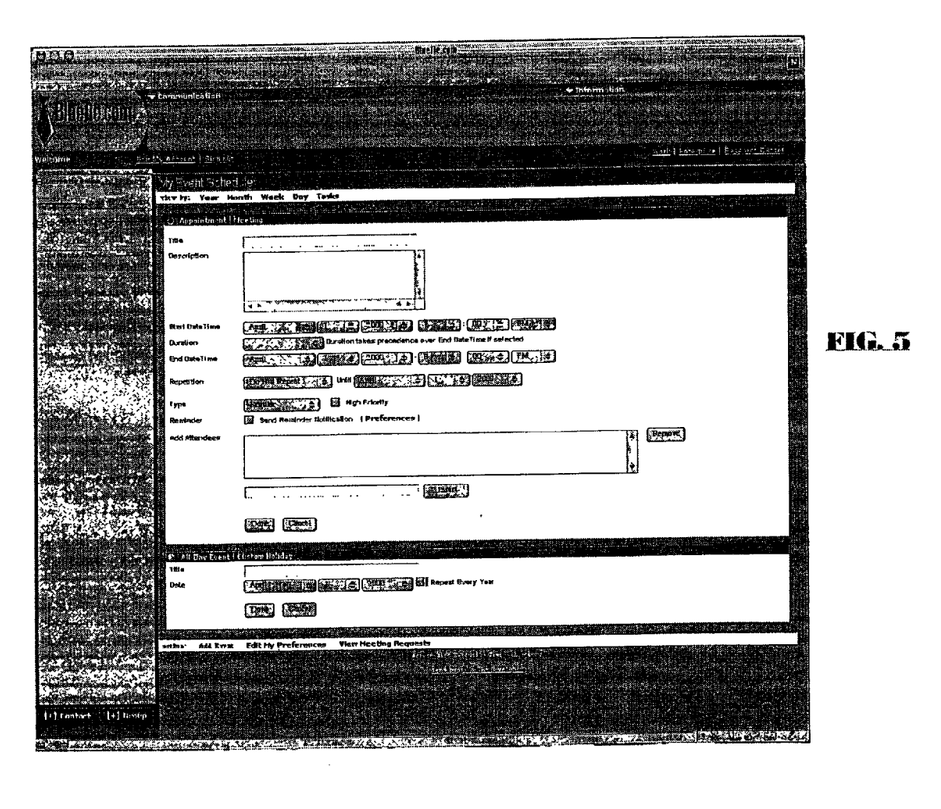
FIG. 5 is a schematic screenshot of a calendar event entry page of the invention showing a contacts listing on the left and a one-click enabled field on the right.
Figure 6:
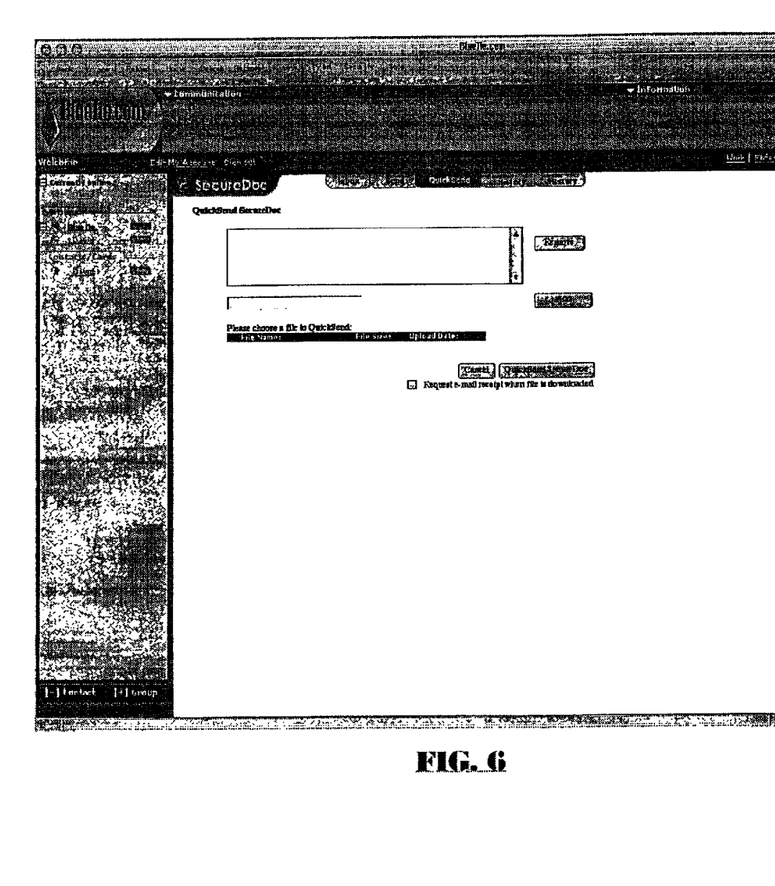
FIG. 6 is a schematic screenshot of a secure file transfer page of the invention showing a contacts listing on the left and a one-click enabled field on the right.
Figure 7:
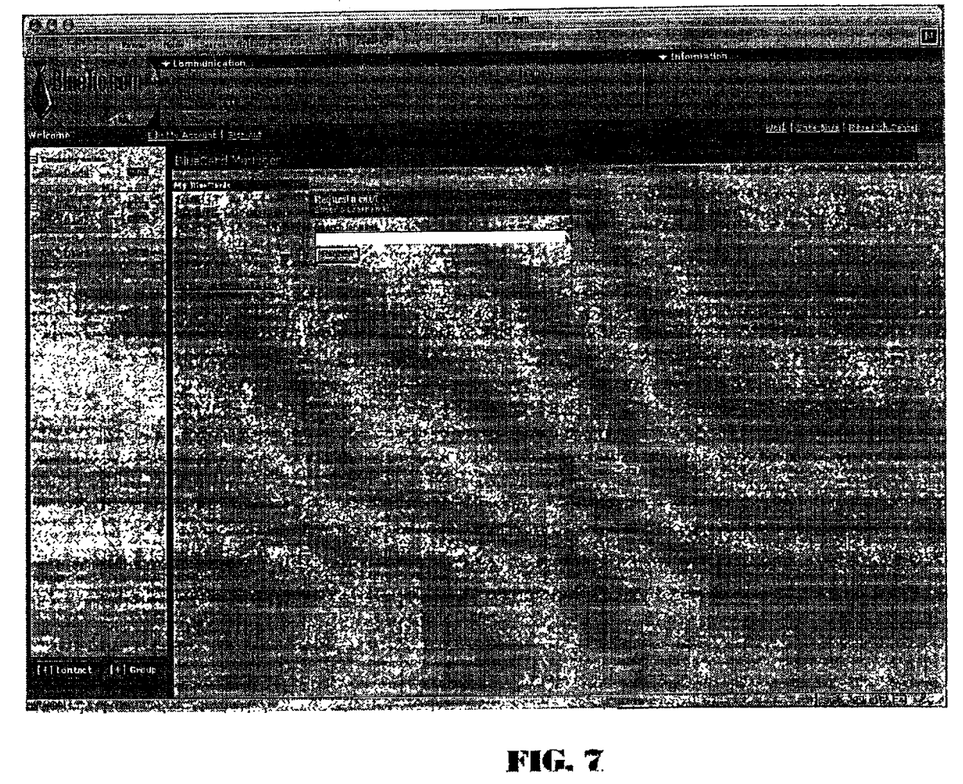
FIG. 7 is a schematic screenshot of a contact information manager page of the invention showing a contacts listing on the left.

The "ProcessOneClick" function is preferably part of the source code of the Target page. If the page includes a one-click enabled field, the function uses the source code to determine what type of information the field is intended to receive and uses the parameters from the "OneClick" function to fill the field. If the "ProcessOneClick" function finds no one-click enabled field or has no suitable parameter, it fills no field. This is an exemplary implementation of the "ProcessOneClick" function that, in the case of the exemplary link above, adds "(Member) John" to a list of attendees in an "Attendees" field in an event on a web-based, one-click enabled calendar as shown in FIG. 5:

```
<script LANGUAGE="JavaScript">
  //client JavaScript Functions
  function ProcessOneClick(msg, id)
  {
    //handles one click
    var type=id.substring(0, id.indexOf (":"));
    type = type.toLowerCase( );
    var val=id.substring(id.indexOf(":")+1, id.lastIndexOf(":"));
    //msg - display name
    switch (type)
    {
      case "group":
        add_select_option(document.forms[0],'Attendees', "(Group)"
            + msg, type + ":" + val, 28, false, false);
        break;
      case "card":
        add_select_option(document.forms[0],'Attendees', "(Member)"
            + msg , type + ":" + val, 30, false, false);
        break;
      case "contact":
        add_select_option(document.forms[0],'Attendees', "(Contact)"
            + msg , type + ":" + val, 30, false, false);
        break;
    }
    return;
  }
</script>
```

I prefer to store the contacts in multiple databases on a central server connected to a computer network, such as the Internet, and render each database accessible to its subscribers whose client computers are also connected to the computer network and are equipped with software capable of receiving and interpreting the pages set up (such as hypertext based pages). In the preferred implementation, the instant invention interacts with a database to allow creation and deletion of records to the database. The Information Distribution System of U.S. patent application Ser. No. 09/853,537 mentioned above is quite suitable for use with the instant system. It should be borne in mind that the instant invention need not be confined to contact information completion, but could conceivably be used with a variety of different types of information and types of fields to be completed.

Many variations are possible without exceeding the scope of the inventive concept described herein. For example, certain programming languages have been described with regard to the preferred embodiment. However, other suitable programming languages, including but not limited to Java, XML, Visual Basic, VB Script, C, C++, C#, JavaScript, Python, ColdFusion, PHP, and ASP, could be used to implement the teachings of this patent.

I claim:

1. A communication system including:
   a field filler;
   an enabled field of an application screen; and
   a hot-linked identifier initiating transfer of information from a database record to the enabled field via the form filler when the identifier is activated.

2. The system of claim 1 wherein the application screen is a hypertext based page.

3. The system of claim 1 wherein the application screen is a JavaScript based page.

4. The system of claim 1 wherein the application screen is a C based page.

5. The system of claim 1 wherein the application screen is a C++ based page.

6. The system of claim 1 wherein the application screen is a Java based page.

7. The system of claim 1 wherein the enabled field is a destination field of a data transfer system.

8. The system of claim 7 wherein the destination field receives an e-mail address.

9. The system of claim 7 wherein the destination field receives a member name, the member name being a name of a member of a site offering access to the data transfer system.

10. The system of claim 1 wherein the hot-linked identifier is a contact identifier referring to a contact record in a contact database.

11. The system of claim 1 further including a tag identifying the enabled field as an enabled field, enabling the field, alerting the field filler to the presence of the field, and telling the field filler what type of information the field accepts.

12. The system of claim 11 wherein the tag is a hypertext tag.

13. The system of claim 1 wherein the field filler is a client-side software function executing a method including the steps of searching a current application screen for an enabled field, accessing the contact record, retrieving information from the contact record relevant to the enabled field, and entering the information into the field.

14. The system of claim 13 wherein the step of searching includes searching for enabling tags.

15. A communication system including an application screen that creates a field into which information can be entered, the field allowing information entry via a computer input device and also being enabled for information entry via a field filler of the system that enters relevant information from a record referred to by a hot-linked identifier into the field when the hot-linked identifier is activated by a user.

16. The system of claim 2 in which the field is a destination field associated with a recipient of data and the hot-linked identifier is a name of a contact found in a respective contact record of a contact database, the field filler taking relevant destination information from the contact record and entering it into the field upon activation of the identifier.

17. The system of claim 16 in which the identifier is presented as part of the application screen in a first frame of an application screen and the field is presented in a second frame of the application screen.

18. The system of claim 17 wherein the application screen is a browser window.

19. The system of claim 17 wherein the identifier is presented in each of a plurality of communications-related application pages.

20. The system of claim 16 in which the identifier is presented in a first frame of an application window and the communication, collaboration or information application page is presented in a second frame of the application screen so that the first frame is present when the user visits any of a predetermined set of communication, collaboration or information applications accessible to the user.

21. A communication system facilitating communication between information senders and recipients, the system including:
- a sender contact database;
- a hot-linked contact identifier presented on an application screen;
- a recipient field on the application screen;
- a field filler that places recipient information from the contact database into the recipient field in response to activation of the hot-linked contact identifier;
- a message send initation object operable by the user to initiate sending of information to a recipient associated with the contact of the contact database and identified in the recipient field.

22. The system of claim 21 wherein application screen includes a section in which it presents the identifier.

23. The system of claim 22 wherein the section is a frame.

24. The system of claim 22 wherein the page includes a contact addition object linked to a contact manager that allows a sender to add a contact to the contact database upon activation of the contact addition object.

25. The system of claim 21 wherein the contact database includes group identifiers specified by the sender that refer to groups of contacts in the sender contact database and the hot-linked contact identifier can be a group identifier.

26. The system of claim 21 wherein the field filler includes a page source parser that examines the source code for tags indicating the presence of an enabled field.

27. The system of claim 21 wherein the field filler enters the information into a default field when the page includes more than one enabled field.

28. The system of claim 21 wherein the filed filler enters information into all enabled fields as determined by tags associated with the fields.

29. The system of claim 1 wherein the hot-linked identifier calls a process that sends the information to the field filler.

30. The system of claim 29 wherein the process is a JavaScript function.

31. The system of claim 1 wherein the field filler is a JavaScript function included in the hypertext based page.

32. The system of claim 21 wherein the field filler is part of the hypertext page and includes identifiers of an enabled field.

33. The system of claim 31 wherein the field filler is a JavaScript function.

* * * * *

UNITED STATES PATENT AND TRADEMARK OFFICE
CERTIFICATE OF CORRECTION

PATENT NO. : 6,879,691 B1 Page 1 of 1
APPLICATION NO. : 09/853539
DATED : April 12, 2005
INVENTOR(S) : David A. Koretz It is certified that error appears in the above-identified patent and that said Letters Patent is hereby corrected as shown below:

Column 4, lines 14-15, replace "the form filler" with --the field filler--;
Column 4, line 46, replace "the contact record" with --a contact record--;
Column 5, lines 7-8, replace "the communication" with --a communication--;
Column 5, line 27, insert --the-- between "wherein" and "application";
Column 6, line 1, replace "the page" with --a page--;
Column 6, line 10, replace, "the source code" with --source code--;
Column 6, line 13, replace "the page" with --a page--;
Column 6, line 24, replace "the hypertext based page" with --a hypertext based page-- ; and
Column 6, line 26, replace "the hypertext page" with --a hypertext page--.

Signed and Sealed this

Eighth Day of August, 2006

JON W. DUDAS
*Director of the United States Patent and Trademark Office*